US009849881B2

(12) United States Patent
Rebhan et al.

(10) Patent No.: US 9,849,881 B2
(45) Date of Patent: Dec. 26, 2017

(54) INTELLIGENT GAP SETTING FOR ADAPTIVE CRUISE CONTROL

(71) Applicant: HONDA RESEARCH INSTITUTE EUROPE GMBH, Offenbach/Main (DE)

(72) Inventors: Sven Rebhan, Offenbach (DE); Marcus Kleinehagenbrock, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 22 days.

(21) Appl. No.: 15/058,564

(22) Filed: Mar. 2, 2016

(65) Prior Publication Data

US 2016/0304092 A1    Oct. 20, 2016

(30) Foreign Application Priority Data

Apr. 14, 2015   (EP) .................................... 15163486

(51) Int. Cl.
    B60W 30/16    (2012.01)
(52) U.S. Cl.
    CPC ......... B60W 30/16 (2013.01); *B60W 2530/14* (2013.01); *B60W 2540/04* (2013.01);
    (Continued)
(58) Field of Classification Search
    CPC ............. B60W 30/16; B60W 2530/14; B60W 2540/04; B60W 2550/00; B60W 2550/10;
    (Continued)

(56) References Cited

U.S. PATENT DOCUMENTS 6,116,369 A * 9/2000 King ................. B60K 31/0008
                                                180/169
6,445,153 B1   9/2002 Sielagoski et al.
(Continued)

FOREIGN PATENT DOCUMENTS

DE    10 2008 061388 A1    7/2009
DE    10 2014 009 625 A1   11/2014
(Continued)

OTHER PUBLICATIONS

European Search Report application No. 15163486.2 dated May 3, 2016.

*Primary Examiner* — Calvin Cheung
(74) *Attorney, Agent, or Firm* — Squire Patton Boggs (US) LLP (57) ABSTRACT

The present invention relates to a method for assisting a driver in driving a vehicle, in which sensor data are produced by at least one sensor physically sensing the environment of a host vehicle or by obtaining data conveying information about the environment of a host vehicle, an object in a path of the host vehicle is detected based on the sensor data, a distance between the host vehicle and the detected object is controlled based on a preset gap ($t_{GAP}$), environmental conditions of the host vehicle are estimated based on the sensor data, gap adaption indicators associated to the estimated environmental conditions are determined, wherein each of the gap adaption indicators indicates an extension or a reduction of the preset gap ($t_{GAP}$) and the preset gap ($t_{GAP}$) is adjusted based on the gap adaption indicators.

12 Claims, 4 Drawing Sheets

(52) U.S. Cl.
CPC ..... *B60W 2550/00* (2013.01); *B60W 2550/10* (2013.01); *B60W 2550/12* (2013.01); *B60W 2550/14* (2013.01); *B60W 2550/146* (2013.01); *B60W 2550/148* (2013.01); *B60W 2550/302* (2013.01); *B60W 2550/308* (2013.01); *B60W 2550/408* (2013.01); *B60W 2750/308* (2013.01)

(58) Field of Classification Search
CPC ......... B60W 2550/12; B60W 2550/14; B60W 2550/146; B60W 2550/148; B60W 2550/302; B60W 2550/308; B60W 2550/408; B60W 2750/308
See application file for complete search history.

(56) References Cited

U.S. PATENT DOCUMENTS

| | | | |
|---|---|---|---|
| 6,622,810 B2 | 9/2003 | Labuhn et al. | |
| 6,810,319 B2* | 10/2004 | Manaka | B60K 31/0008 340/903 |
| 8,078,382 B2* | 12/2011 | Sugano | B60W 10/06 180/170 |
| 2002/0099491 A1* | 7/2002 | Akabori | B60K 31/0008 701/96 |
| 2002/0161506 A1 | 10/2002 | Ishizu et al. | |
| 2003/0204298 A1* | 10/2003 | Ahmed-Zaid | B60K 31/0008 701/96 |
| 2004/0061626 A1* | 4/2004 | Kubota | B60K 31/0008 701/96 |
| 2006/0100769 A1* | 5/2006 | Arai | B60W 30/16 701/96 |
| 2007/0213914 A1* | 9/2007 | Etori | B60K 31/042 701/96 |
| 2009/0157276 A1* | 6/2009 | Kade | B60W 10/06 701/96 |
| 2012/0123660 A1 | 5/2012 | Kagawa et al. | |
| 2012/0268260 A1* | 10/2012 | Miller | B60W 50/14 340/435 |
| 2012/0290159 A1 | 11/2012 | McGee et al. | |
| 2013/0103295 A1 | 4/2013 | Koshizen et al. | |
| 2013/0138320 A1* | 5/2013 | Aso | B60W 30/16 701/96 |
| 2013/0187771 A1* | 7/2013 | Rothschild | G08G 1/096716 340/435 |
| 2016/0176402 A1* | 6/2016 | Andersson | B60W 30/16 701/96 |
| 2017/0080939 A1* | 3/2017 | Raghu | B60W 30/16 |

FOREIGN PATENT DOCUMENTS

| | | |
|---|---|---|
| EP | 1 170 652 A1 | 1/2002 |
| EP | 1 317 359 B1 | 8/2011 |
| EP | 2 730 945 A1 | 5/2014 |
| WO | 2013/147684 A1 | 10/2013 |

\* cited by examiner

INTELLIGENT GAP SETTING FOR ADAPTIVE CRUISE CONTROL

BACKGROUND

Field

The present invention relates to a method for assisting a driver in driving a vehicle, a driver assistance system, a computer software program product and a vehicle including such driver assistance system.

Description of the Related Art

Conventional adaptive cruise control (ACC) systems control the vehicle speed according to a target speed setting, detect moving objects in the vehicle path, such as preceding vehicles, and provide throttle and brake control, if necessary, to maintain a trailing distance (headway or time gap) from the preceding vehicle.

DE 10 2008 061 388 A1 discloses an adaptive cruise control system in which the vehicle speed and the gap can be set and adjusted by the vehicle operator. In DE 10 2008 061 388 A1, if a preceding vehicle is detected, a gap is selected automatically on basis of the detected distance from the preceding vehicle and the vehicle operator can later adapt the selected gap.

U.S. Pat. No. 6,622,810 B2 discloses an ACC system that automatically modifies the gap to limit the follow distance to the predecessor in order to keep this predecessor in sensor range.

EP 2 730 945 A1 discloses an ACC system that automatically modifies the gap based on the determined position, velocity and acceleration of both the ego-vehicle and the predecessor and a model comprising statistical noise characteristics of the ego-vehicle sensors to ensure a safe distance in case of strong braking of the predecessor vehicle.

US2012/0123660A1 discloses a system, in which the amount of traffic is estimated and the inter-vehicle distance and the vehicle speed are set based on the amount.

EP1317359 B1 discloses an ACC system, in which the gap is increased automatically when low friction is determined by detecting wheel slip using Anti-lock Braking System (ABS), traction control and vehicle stability control.

U.S. Pat. No. 6,445,153B1 discloses an ACC system that determines a driving surface coefficient of friction based on a driven wheel speed of the vehicle and that automatically modifies the gap based on the driving surface coefficient of friction.

In conventional adaptive cruise control systems, the vehicle operator/driver can adapt the gap to the preceding vehicle manually by choosing from a small number of gap settings. In this way, the driver can use dedicated different gap sizes for different environmental conditions.

For example, in case of a confusing traffic situation or very low traffic density, a driver might prefer a larger gap to the preceding vehicle than in normal traffic situations in order to feel more comfortable.

In case of very dense traffic, the driver might prefer a smaller gap to the preceding vehicle than in normal traffic situations in order to prevent frequent cut-ins of other vehicles or in order to raise capacity utilization of the road.

Particularly if the driving/environmental conditions change frequently, the driver often has to adapt the gap setting of the ACC manually, which can be uncomfortable.

SUMMARY

It is an object of the present invention to provide a method for assisting a driver in driving a vehicle, a driver assistance system, a computer software program product and a vehicle including such driver assistance system with which gap size can be adapted to different environmental conditions automatically.

This object is achieved by the inventive method for assisting a driver in driving a vehicle, a driver assistance system, a computer software program product and a vehicle including such driver assistance system according to the enclosed independent claims. Advantageous features of the present invention are defined in the corresponding sub claims.

According to the present invention, a method for assisting a driver in driving a vehicle comprises the steps of: producing sensor data by at least one sensor; physically sensing the environment of a host vehicle and/or by obtaining data conveying information about the environment of a host vehicle; detecting an object in a path of the host vehicle based on the sensor data; controlling a distance between the host vehicle and the detected object based on a preset gap; estimating environmental conditions of the host vehicle based on the sensor data; determining gap adaption indicators associated to the estimated environmental conditions, wherein each of the gap adaption indicators indicates an extension or a reduction of the preset gap; and adjusting the preset gap based on the gap adaption indicators.

In the estimating step, an ego-distance between the ego-vehicle and the detected object can be estimated; and in the determining step, at least one of the gap adaption indicators indicates whether or not the ego-distance fits the associated environmental condition.

Further, in the estimating step, the ego-distance and distances between other vehicles can be estimated; and in the determining step, a gap adaption indicator can be determined based on the difference between the ego-distance and an average of the distances between the other vehicles and/or other statistical evaluation of distances between vehicles including minimum distance $G_{min}$, maximum distance $G_{max}$, range of $G_{max}-G_{min}$, and/or the trend/development of the distances estimated at different times.

In another advantageous embodiment, in the estimating step, at least one of the environmental conditions of oscillation in velocity of the detected object, traffic density, gap size between other vehicles, distance to successor of ego-vehicle, road shape such as a curve/inclination, road surface state, construction site and time of day is estimated; wherein each of an increased oscillation in velocity of the detected object, an increased traffic density, a gap size between other vehicles larger than the preset gap, a distance to the successor of the ego-vehicle larger than the preset gap, beginning of a curve, deterioration in the road surface state, beginning of a construction site and beginning of night-time period is associated to a respective gap adaption indicator indicating an extension of the preset gap; and each of a decreased oscillation in velocity of the detected object, a decreased traffic density, the gap size between other vehicles smaller that the preset gap, a distance to the successor of the ego-vehicle smaller that the preset gap, an end of a curve, an improved road surface state, an end of construction site and end of night-time period is associated to a respective gap adaption indicator indicating a reduction of the preset gap.

In the determining step, a plurality of the gap adaption indicators based on a plurality of the estimated environmental conditions can be determined; and in the adjusting step, the preset gap can be adjusted based on an overall gap adaption indicator determined from the plurality of the gap adaption indicators.

When the preset gap corresponds to one of gap settings selectable by a user, in the adjusting step, current gap setting n can be switched to gap setting n−1 out of the set [$n_{min}, \ldots ; n_{max}$], if $n>n_{min}$ and the gap adaption indicators indicate to reduce the preset gap; and current gap setting n can be switched to gap setting n+1 out of the set [$n_{min}, \ldots ; n_{max}$], if $n<n_{max}$ and the gap adaption indicators indicate to enlarge the preset gap.

When the preset gap corresponds to one of the gap settings $n_{min}$ to $n_{max}$ selectable by a user, in the adjusting step, gap size associated to each gap setting $n>n_{min}$ can be reduced if the gap adaption indicators indicate to reduce the preset gap ($t_{GAP}$); and gap size associated to each gap setting $n<=n_{max}$ can be increased if the gap adaption indicators indicate to enlarge the preset gap).

The method can further comprise the steps of detecting a manual adjustment of the preset gap; and storing current environmental conditions associated to the manual adjustment.

Further, at least current geographic location of the ego-vehicle and current time of day associated to the manual adjustment can be stored and, when a geographic location that corresponds to the stored geographic location or a time of day that corresponds to the stored time of day are estimated in the estimating step, in the determining step, a gap adaption indicator indicating an adjustment of the preset gap that corresponds to the manual adjustment can be determined.

The method can further comprise the steps of receiving at least one of the current gap size applied by a driver, the current time of day, and the current geographical location of at least one other vehicle (B.,D.); storing all received gap sizes categorized by time and location; and calculating the average gap size, minimum gap size and/or maximum gap size applied for each time and location.

When the preset gap is adjusted in the adjusting step and a manual correction of the adjusted preset gap is detected, said gap adaption indicator can be updated according to the manual correction.

A driver assistance system according to the present invention comprises means for producing sensor data by at least one sensor; means for physically sensing the environment of a host vehicle and/or by obtaining data conveying information about the environment of a host vehicle; means for detecting an object in a path of the host vehicle based on the sensor data; means for controlling a distance between the host vehicle and the detected object based on a preset gap; means for estimating environmental conditions of the host vehicle based on the sensor data; means for determining gap adaption indicators associated to the estimated environmental conditions, wherein each of the gap adaption indicators indicates an extension or a reduction of the preset gap; and means for adjusting the preset gap based on the gap adaption indicators.

Further, in the driver assistance system means for receiving user input to switch on/off automatic gap adaptation and means for receiving user input indicating an additive or multiplicative offset to the automatically determined gap can be provided.

The vehicle according to the present invention includes such driver assistance system comprising means for producing sensor data by at least one sensor; means for physically sensing the environment of a host vehicle and/or by obtaining data conveying information about the environment of a host vehicle; means for detecting an object in a path of the host vehicle based on the sensor data; means for controlling a distance between the host vehicle and the detected object based on a preset gap; means for estimating environmental conditions of the host vehicle based on the sensor data; means for determining gap adaption indicators associated to the estimated environmental conditions, wherein each of the gap adaption indicators indicates an extension or a reduction of the preset gap; and means for adjusting the preset gap based on the gap adaption indicators.

The computer software program product according to the present invention performs, when executed on a computer, the steps of producing sensor data by at least one sensor; physically sensing the environment of a host vehicle and/or by obtaining data conveying information about the environment of a host vehicle; detecting an object in a path of the host vehicle based on the sensor data; controlling a distance between the host vehicle and the detected object based on a preset gap; estimating environmental conditions of the host vehicle based on the sensor data; determining gap adaption indicators associated to the estimated environmental conditions, wherein each of the gap adaption indicators indicates an extension or a reduction of the preset gap; and adjusting the preset gap based on the gap adaption indicators.

BRIEF DESCRIPTION OF THE DRAWINGS

The invention is to be explained more detailed in the following with reference to the accompanying drawing, wherein.

DETAILED DESCRIPTION

A vehicle equipped with a driver assistance system may be referred to herein as "host-vehicle" or "ego-vehicle". According to the present invention, the host vehicle or ego-vehicle may be a car, truck, bus or motorcycle, or in general any object that can use active cruise control. The vehicles may include manned vehicles driven by a driver but also automatically driven vehicles such as robot vehicles. In this respect, the term "driver assistance system" is to be understood herein as including in general any kind of driving assistance system which may be employed in unmanned vehicles as well.

Similarly, the detected objects may include any kind of moving objects such as other vehicles, cars, trucks, busses, motor/cyclists, robotic vehicles, but also trolleys, pedestrians, and even animals such as horses. The objects may be detected by any kind of sensor equipment or circuitry hosted by the ego-vehicle. The object under consideration may be referred to herein as "target object" or "target vehicle". The gap and headway are a measurement of the distance or time between vehicles. In the adaptive cruise control, the gap or headway can be controlled to maintain a constant value or to maintain a safety distance (or another distance) that is dependent on the velocity of the ego-vehicle.

Figure 1A:
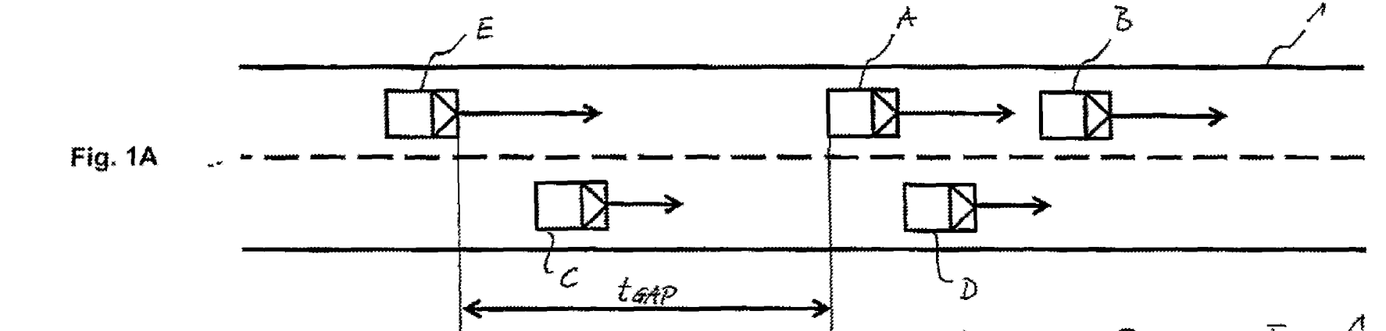
FIGS. 1A and 1B are schematics for explaining a functioning of a conventional driver assistance system in a first and second traffic situation.
Figure 1B:
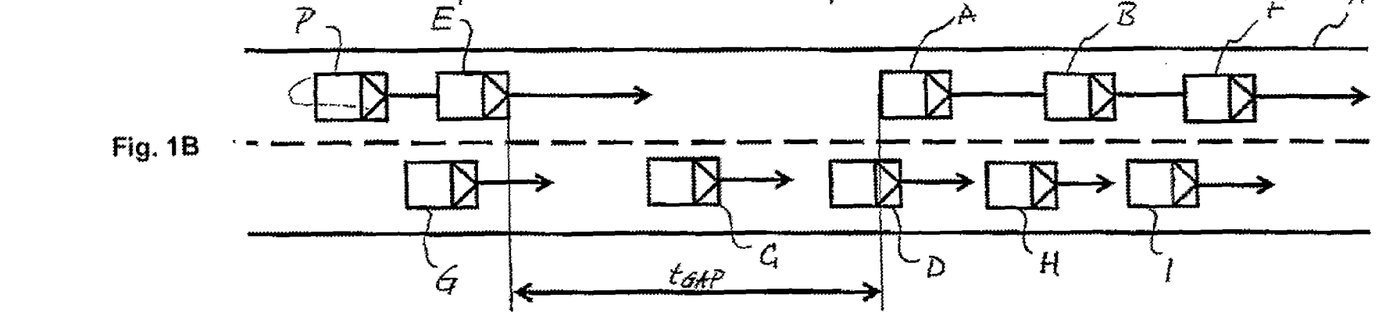

FIG. 1A illustrates a first traffic situation with vehicles A, B, C, D and E traveling on a road 1 with two lanes and a second situation 1B with vehicles A, B, C, D, E, F, G, H, I and P traveling on the road 1.

In FIGS. 1A and 1B, the ego-vehicle E is equipped with a conventional ACC system and a desired gap is preset by the driver of the ego-vehicle E. The ACC system of the ego-vehicle E controls the distance between the ego-vehicle E and the ACC target vehicle A based on the preset gap and the velocities of the ego-vehicle E and predecessor A. In FIGS. 1A and 1B, the traffic densities are different and the ego-vehicle E follows the ACC target vehicle A at the same distance.

In FIG. 1A, the preset gap $t_{GAP}$ fits the light traffic well. In such traffic situations it can be assumed that vehicle C will recognize a fitting gap between vehicles E and A but also that behind ego-vehicle E there is plenty of free lane. Thus it can be expected that vehicle C lets ego-vehicle E pass and change lane behind ego-vehicle E. The same gap $t_{GAP}$ is used in a more dense traffic in situation 1B. In situation 1B, the gaps between the other vehicles A, B, F, G, C, D, H, I and the gap between the successor vehicle P and the ego-vehicle E are smaller than the preset gap $t_{GAP}$. Here keeping a larger gap $t_{GAP}$ can be "incomprehensible" to other drivers and can provoke cut-ins of, e.g. vehicle C or "pushing" of the very close successor vehicle P.

In FIG. 1B, the driver of the ego-vehicle E will prefer a smaller gap, which also raises capacity utilization of the road 1. For reducing the gap $t_{GAP}$, the driver of the ego-vehicle E has to adapt/change the preset gap manually. If the situations of FIGS. 1A and 1B change frequently, the driver of the ego vehicle E often has to adapt the gap setting of the ACC manually which can be uncomfortable.

With the present invention, different gap sizes for different environmental conditions can be set automatically. The driver assistance system according to the present invention automatically detects whether the current gap size fits the driving condition or whether it needs to be adapted (reduced or enlarged). The system uses a set of indicators like current traffic situation, geographic location, etc. to determine the need for gap size adaptation.

In case the gap size needs to be adapted, in a second step, the driver assistance system according to the present invention adapts the gap settings. This adaptation can be either done in discrete steps (e.g., by choosing between predetermined gap settings or adapt the gap size in predefined discrete steps) or, alternatively, by estimating the optimal gap setting from the observed vicinity or predefined values (e.g., a statistically determined gap size for a certain geographic location) or a combination thereof.

Figure 2:
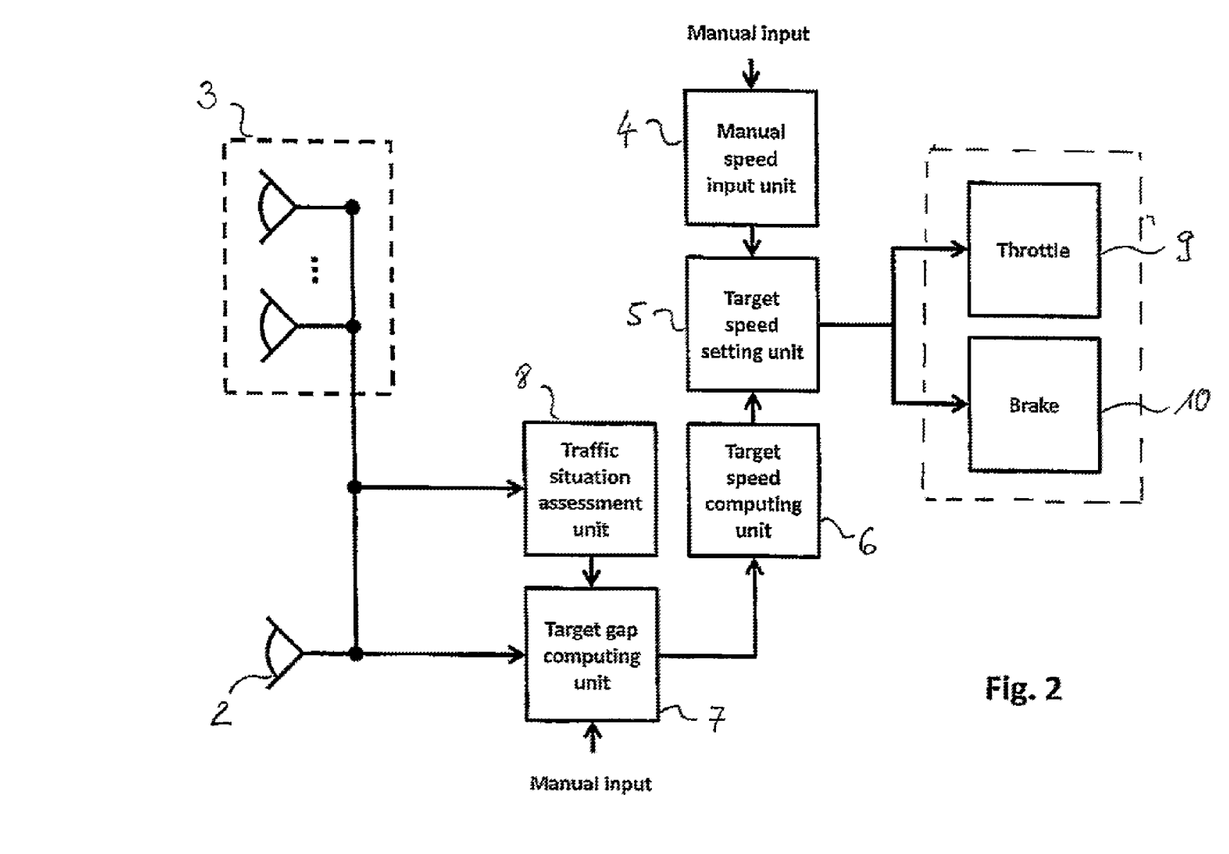
FIG. 2 shows, in schematic form, an embodiment of the driver assistance system according to the present invention.

FIG. 2 shows an embodiment of the driver assistance system according to the present invention. The driver assistance system is mounted on the ego-vehicle E and is preferably integrated with existing systems of such host vehicle. In particular, controls such as an accelerator or motor management, power steering or a braking system may be used by the driver assistance system according to the present invention.

The driver assistance system shown in FIG. 2 comprises at least one sensor 2 which is capable of physically sensing the environment of the ego-vehicle E. Such sensor 2, for example a radar sensor, produces data that allow analyzing a relative position and orientation of a target vehicle as well as the current speed of the sensed target object.

Since it is difficult to have only one sensor 2 which is capable of sensing the entire environment of the host vehicle and thereby covering an area on both sides of the ego-vehicle E as well as the forward direction and the rearward direction, it is preferred to have a plurality of sensors. The plurality of sensors may but do not need to be of the same type. In the illustrated embodiment in addition to radar sensor 2, optical sensors 3 are present so that the environment of the host vehicle can be analyzed by using image processing.

If the ego-vehicle E is already equipped with sensor 2 and/or sensor 3 that are needed for other assistance or comfort functions, these sensors may be used in common.

As shown in FIG. 2, the driver assistance system further comprises a manual speed input unit 4, a target speed setting unit 5, a target speed computing unit 6, a target gap computing unit 7 and a traffic situation assessment unit 8. The throttle 9 and the brake 10 indicated by a dotted line in FIG. 2 are controlled by the driver assistance system but are not elements of the driver assistance system. The manual speed input unit 4 is advantageously for vehicles driven by a driver and is not essential for automatically driven vehicles such as robot vehicles.

The manual speed input unit 4 can include a set switch for setting the current speed as the set-speed, a resume switch for resuming the speed which was selected in the previous operation of the Adaptive Cruise Control (ACC) and a cancel switch for deactivating the cruise control. By pressing the resume switch and the set-switch for a short duration, the set-speed can be increased and decreased, respectively, by a small increment.

The target speed setting unit 5 receives commands for the target speed from the target speed computing unit 6 and from the manual speed input unit 4 and sets a target speed of the ego-vehicle E according to the commands. When the Adaptive Cruise Control is in place, the target speed setting unit 5 sends a corresponding command signal to the throttle 9 of the engine and, optionally, to the brake 10 of the ego-vehicle E so that either the target speed or the set-speed is achieved and maintained, depending on which speed is lower.

The target speed computing unit 6 receives sensor data from the sensor 2 and/or 3 and determines the traveling speed of the ego-vehicle E that is required to maintain the gap given by the target gap computing unit 7 at a particular value. Based on the sensor data, the target gap computing unit 7 determines a target gap between the ego-vehicle E and the target vehicle A. This value of the gap may be determined from the traveling speed of the ego-vehicle E and possibly other factors, such as weather conditions, road conditions and personal preferences which might be given by manual input as, for example, the gap setting. It is to be noted that the gap can be defined as a time period between the point in time when the target vehicle passes a particular point and when the ego vehicle passes the same point. This result is an automated correction of the gap length with respect to actual speed.

The traffic situation assessment unit 8 receives sensor data from the (on-board) sensor 2 and/or 3 of the ego-vehicle E and/or from external sensors, e.g. sensors of another vehicle or an external traffic information system (not shown), estimates environment conditions of the ego-vehicle E based on the sensor data, assigns the estimated environment conditions to respective indicators indicating an extension or a reduction of the current (preset) gap and determines whether the current gap size fits the current traffic condition or in how far it needs to be adapted (reduced or enlarged) based on the indicators.

The required deviation from a current (neutral) gap setting is provided to the target gap computing unit 7. For example, the needed deviation could be encoded as floating point number between −1,0 and 1,0 (−1,0: reduce the gap size to minimum, 0: no adaptation, 1,0: enlarge the gap size to a maximum) or integer steps in case of discrete gap size settings (e.g. −5 to +5).

The target gap computing unit 7 can be adapted to receive (e.g. by switch or menu entry) commands from the driver (user) to turn on/off the gap size adaptation. For example, if the gap size adaptation is switched off, the output from the traffic situation assessment unit 8 is ignored.

The extension or reduction of the current (preset) gap indicated by the adaptation indicators can be carried out, for example, by changing between predetermined gap settings (variant 1) or by switching from constant gap values to continuous gap values (variant 2).

In variant 1, if traffic situation assessment unit 8 suggests to reduce the selected gap and, for example, gap setting G2 out of the gap settings "G1": 2s; "G2": 2,2s; "G3": 2,4s; "G4": 2,6s; and "G5": 2,8s has been chosen by the user, gap setting "1" (=2s) is chosen by the target gap computing unit 7. In other words, the target gap computing unit 7 switches from gap setting n (if $n>n_{min}$) to gap setting n−1, if traffic situation assessment unit 8 suggests to reduce the gap and the target gap computing unit 7 switches from gap setting n (if $n<n_{max}$) to gap setting n+1, if traffic situation assessment unit 8 suggests to enlarge the selected gap. In both cases, the target gap computing unit 7 can be adapted to switch back to the initially selected gap setting (setting "G2": 2,2s) if the traffic situation assessment unit 8 no longer suggests to adapt (reduce/enlarge) the initially selected gap size to the current traffic flow or if no signal is output from the traffic situation assessment unit 8 due to a system failure. In the gap setting as described above, the smallest unity/step that can be switched/set is 0,2s. Alternatively, the target gap computing unit 7 can adapt the gap setting in steps that are different from the gap settings G1 . . . G5. In this way, if traffic situation assessment unit 8 suggests to reduce/enlarge the selected gap G2, the selected gap G2 can be adapted in smaller steps (e.g., −0,1s/+0,1s) or in larger steps (e.g., −0,3s/+0,3s) with respect to the gap settings G1 . . . G5 (−0,2s/+0,2s). Further, the target gap computing unit 7 can be adapted to reduce the gap setting G2 in small steps (e.g., −0,1s) and to enlarge the selected gap G2 in large steps (e.g., +0,3s; or switching from "G2" to "G4").

In variant 2, the target gap computing unit 7 switches from constant gap values to continuous gap values, wherein the time gap value for each gap setting gets adapted. If the traffic situation assessment unit 8 suggests adapting (reduce/enlarge) the initially selected gap size to the current traffic flow (environment conditions) and, for example, gap setting "2" out of the gap settings "1": 2s, "2": 2,4s and "3": 2,8s has been chosen by the user, the target gap computing unit 7 keeps gap setting "2", but changes gap setting "2" to 2,2s and gap setting "3" to 2,5s. Gap setting "1" is not reduced, because it is already the legal minimum. In other words, the target gap computing unit 7 adapts the value of gap setting n (if n>1) to a value ∈ [value(gap setting n−1), . . . ; value(gap setting n)) if traffic situation assessment unit 8 suggests to reduce the gap and the target gap computing unit 7 adapts the value of gap setting n (if $n<n_{max}$) to a value ∈ [value(gap setting n), . . . , value(gap setting n+1)] if traffic situation assessment unit 8 suggests to enlarge the selected gap. In both cases, the target gap computing unit 7 can be adapted to switch back to the initial gap sizes if the traffic situation assessment unit 8 no longer suggests to adapt (reduce/enlarge) the initial gap sizes to the current traffic flow or in case of system failure.

The traffic situation assessment unit 8 estimates the environment conditions of the ego-vehicle E based on the sensor data to adapt the current gap size (reduce or enlarge) or to maintain/confirm the current gap size.

One, some or all of the following environment conditions can be estimated by the traffic situation assessment unit 8:
 Oscillation in velocity (e.g. in very dense traffic, traffic jam, distracted predecessor)
  ego-vehicle E needs to accelerate/decelerate "often" to keep a gap to the predecessor,
  observed frequent accelerations/decelerations of other traffic participants,
 Traffic density
  number of perceived vehicles,
  velocity difference between lanes (e.g., difference in average velocity of vehicles among lanes),
  external information (e.g. Traffic Message Channel (TMC), web service,
  vehicle-to-vehicle/vehicle-to-infrastructure (V2X) communication),
 gap sizes between other vehicles
 ego-vehicle gets "pushed"
  distance to successor of ego-vehicle,
  ego-vehicle is overtaken on the right-hand side,
  other vehicle honks, turns up the headlights,
 road properties
  curvature of the road,
  road surface state,
  construction site,
 time of day (e.g. day-time vs. night-time), and
 geographic location
  special characteristics of road, e.g., curvy, steep inclination,
  differences in driving style (e.g. different countries or regional differences within a country).

Each condition can be associated to a gap adaption indicator indicating an extension n+1 or n+2, or . . . ; of the current gap setting n or a reduction n−1 or n−2, or . . . ; of the current gap setting n. Further a gap adaption indicator can be calculated by subtracting the current gap size from a reference/recommended gap size determined based on the environmental condition. For example, the recommended gap size can be determined based on the gap sizes between other vehicles (average gap size, minimum gap size, maximum gap, trend etc.) or based on the gap sizes between other vehicles and the velocity of the ego-vehicle E.

A combination of all gap adaption indicators can be used to determine whether the current gap size is to be adapted or maintained. In this way, when the combination of gap adaption indicators indicating an extension and gap adaption indicators indicating a reduction is balanced, gap adaption is not necessary/indicated. For example, if in FIG. 1B the gap adaption indicator associated to the gap between the successor vehicle P and the ego-vehicle E indicates a reduction of the preset gap $t_{GAP}$ of −0,2s because the gap between the successor vehicle P and the ego-vehicle E is smaller than the preset gap $t_{GAP}$ and the gap adaption indicator associated to the trend of the gaps between the preceding vehicles A, B, F, D, H, I indicates a rising of the preset gap $t_{GAP}$ of +0,2s, the combination of the gap adaption indicators indicates a gap adaption of ±0s; i.e., gap adaption is not necessary/indicated. On the other hand, if the gap adaption indicator associated to the gap between the successor vehicle P and the ego-vehicle E indicates a reduction of the preset gap $t_{GAP}$ of +0,2s, the gap adaption indicator associated to the trend of the gaps between the preceding vehicles A, B, F, D, H, I indicates a rising of the preset gap $t_{GAP}$ of +0,2s, and the gap adaption indicator associated to the road properties indicates a rising of the preset gap $t_{GAP}$ of +0,1s, the combination of the gap adaption indicators indicates a gap adaption of the preset gap $t_{GAP}$ of +0,1s. Additionally, the gap adaptation indicators might be weighted to account for e.g. reliability of the indicators or user preferences, etc., or might be combined in a more complex manner e.g. by using machine learning techniques.

The gap adaption indicators (amount and/or polarity of adaption and/or weighted) associated to the environmental conditions can be preset by the manufacturer of the ego-vehicle E or by the user (driver). Further, the preset gap adaption indicators can be manually changed by the user (driver) and/or can be automatically changed in line with a manual user correction of a gap that was adapted/set by the target gap computing unit 7 based on the estimated environmental conditions.

Additionally or alternatively, each manual gap setting/adaption by the user can be detected and associated to current environmental conditions for statistical evaluation, wherein the environmental conditions including, for example, the current geographic location and the current time of day can be used to generate/update statistical data. The statistical data are used to adapt and/or set the gap size.

Further, gap setting/adaption and/or the statistical data can be collected from other vehicles that are equipped with the corresponding sensors via C2X or any other communication technology connectivity.

Such statistical data can be generated by the steps of:
1) using connectivity of all equipped vehicles to periodically collect at least one of
   the current gap size applied by the driver (with and without ACC)
   the current time of day
   the current geographical location
2) storing all collected gap sizes categorized by time and location, and
3) calculating the average gap size applied for each time and location. Steps 1) to 3) can be performed continuously in order to keep the average gap sizes up to date.

With statistical data, the gap size of the ego-vehicle E can be adapted to the average gap size usually applied by the driver(s) for the current time of day and for the current geographic location. The average gap sizes could be, e.g., provided via connectivity or stored on a local storage on the ego-vehicle E and updated via connectivity.

The traffic situation assessment unit 8 can be adapted to determine whether or not the current gap size is to be adapted based on the statistical data, current gaps between other (neighbor) vehicles or other environmental conditions and the target gap computing unit 7 can be adapted to receive (e.g. by switch or menu entry) commands for selecting one of the determination modes.

Additionally or alternatively, the target gap computing unit 7 can be adapted to receive user input to switch on/off automatic gap adaptation; to receive user input as additive offset to the automatically determined gap; or to receive user input as factor with the automatically determined gap and/or can be adapted to mix user input and automatically determined gap by weighted average.

Further, the traffic situation assessment unit 8 can be adapted to calculate a continuous gap directly. For example, depending on the environmental conditions, an average gap of the surrounding vehicles can be set as continuous gap; a gap proportional to: gap_target−(average of observed gaps to predecessor vehicle A−gap_target) can be set as continuous gap, which covers "oscillations in velocity" with limited number of observations; or a gap proportional to: 0,5* (gap_ego_successor+gap_ego_predecessor) can be set as continuous gap, which covers "pushing of ego-vehicle" and leads to a balance gap between predecessor and the ego-vehicle E.

The continuous gap can be incrementally adapted by, for example, increment/decrement gap by fixed amount; increment/decrement gap by amount proportional to indication confidence; and reducing the gap in small steps, increase in large steps.

Generally, the gap can be decreased in case of: increasing traffic density (e.g. proportional to number of observed vehicles) or the traffic density is within a certain range; traffic jam or slow-moving traffic (to maximize utilization of road capacity) and pushing of other vehicles, and can be increased in case of: decreasing traffic density (traffic density is within a certain range); strong oscillations in velocity of predecessor, other vehicles, or the ego-vehicle E; bad road condition, night time and curvy road.

Figure 3:
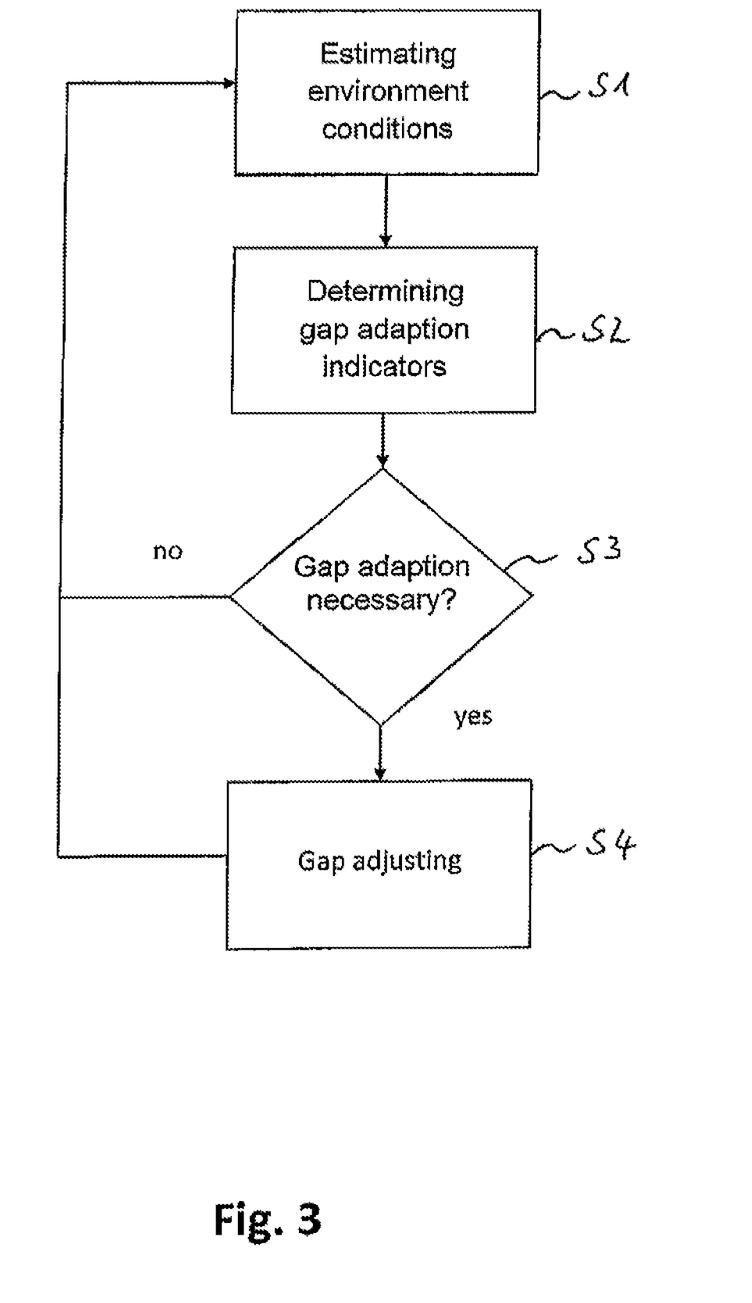
FIG. 3 shows a flowchart illustrating an operation of gap adaptation according to the present invention.

FIG. 3 shows a flowchart illustrating an example of gap adaptation operation according to the present invention which can be combined with any conventional adaptive cruise control method. As shown in FIG. 3, in step S1, the traffic situation assessment unit 8 estimates environmental conditions of the ego-vehicle E based on the sensor data received from the (on-board) sensor 2 and/or 3 of the ego-vehicle E and/or from external sensors or an external traffic information system (e.g. TMC, GPS). In step S2, indicators assigned to the estimated environmental conditions are determined based on the statistical data or a table in which one or more environmental conditions are associated to a respective indicator indicating amount and/or polarity of adaption and the weighting and combination of the indicators (total gap adaptation indicator) is calculated from the determined indicators as described above. Alternatively, in another operation which could be selected by the driver, an average gap size can be calculated from environmental conditions indicating current gap sizes between other vehicles and a gap adaptation indicator indicating the average gap size can be generated. In step S2, it is determined whether or not adaptation of the preset gap is necessary. This can be performed by determining whether or not the total gap adaptation indicator indicates an extension/reduction or by determining whether or not the average gap size is larger or smaller than the preset gap. If an adaptation is necessary, the preset gap is adjusted based on the gap adaptation indicator in step S4. This can be performed by the variant 1 or 2, or other methods as described above.

Figure 4A:
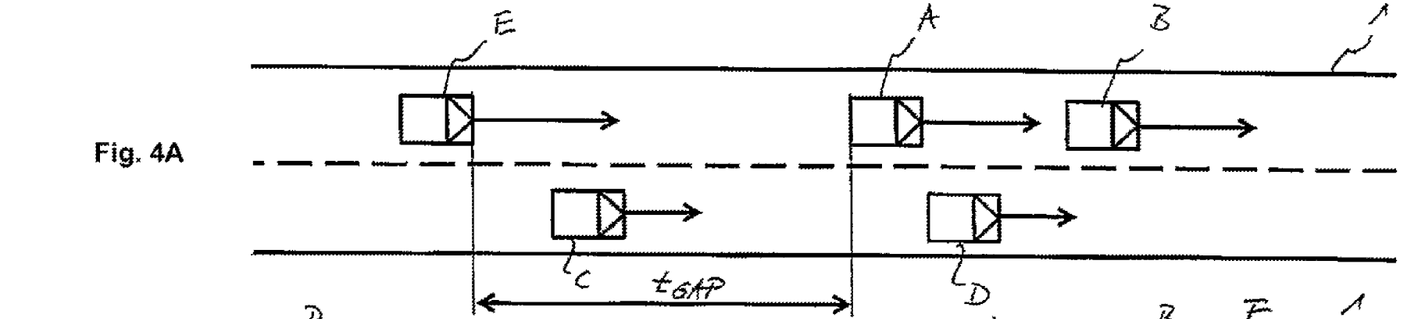
FIGS. 4A and 4B are schematics for explaining a functioning of the driver assistance system according to the present invention in a first and second traffic situation.
Figure 4B:
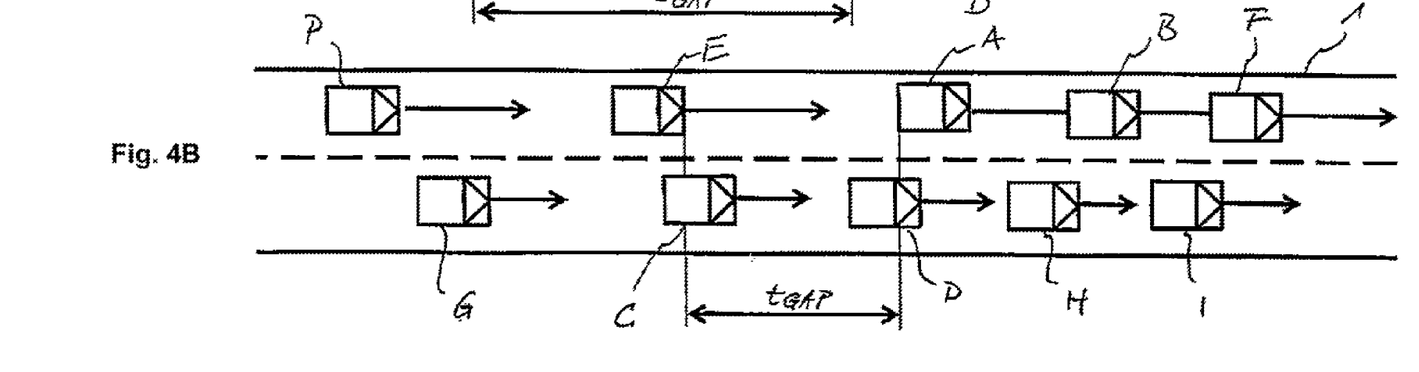

FIG. 4A illustrates a first traffic situation that corresponds to the first traffic situation shown in FIG. 1A. In FIGS. 4A and 4B, the ego-vehicle E is equipped with the driver assistance system according to the present invention and a desired gap is preset by the driver of the ego-vehicle E. In FIGS. 4A and 4B, the traffic densities are different and the ego-vehicle E follows the ACC target vehicle A with an automatically adapted gap $t_{GAP}$. In this example the gap $t_{GAP}$ is chosen according to the traffic situation. As shown in FIG. 4A, the system chooses a larger gap for the light traffic to ensure high comfort, high safety driving. In FIG. 4B the system reduces the gap in dense traffic. This leads to higher acceptance by other drivers, reduces cut-ins from adjacent lanes and minimizes "pushing" of the ego-vehicle's successor P.

The invention claimed is:

1. A method for assisting a driver in driving a vehicle, comprising the steps of:
producing sensor data by at least one sensor physically sensing the environment of a host vehicle or by obtaining data conveying information about the environment of a host vehicle;
detecting an object in a path of the host vehicle based on the sensor data;
controlling a distance between the host vehicle and the detected object based on a preset gap ($t_{GAP}$);
estimating environmental conditions of the host vehicle based on the sensor data;
determining gap adaption indicators associated to the estimated environmental conditions, wherein each of the gap adaption indicators indicates an extension or a reduction of the preset gap ($t_{GAP}$); and
adjusting the preset gap ($t_{GAP}$) based on the gap adaption indicators; wherein
in the estimating step, an ego-distance between the ego-vehicle and the detected object and distances between other vehicles are estimated;
in the determining step, at least one of the gap adaption indicators indicates whether or not the ego-distance fits the associated environmental condition; and
a gap adaption indicator is determined based on the difference between the ego-vehicle time gap and an average of the time gaps between the other vehicles, minimum of the time gaps between the other vehicles and/or maximum of the time gaps between the other vehicles.

2. The method according to claim 1, wherein
in the determining step, a plurality of the gap adaption indicators based on a plurality of the estimated environmental conditions is determined; and
in the adjusting step, the preset gap ($t_{GAP}$) is adjusted based on an overall gap adaption indicator determined from the plurality of the gap adaption indicators.

3. A method for assisting a driver in driving a vehicle, comprising the steps of:
producing sensor data by at least one sensor physically sensing the environment of a host vehicle and/or by obtaining data conveying information about the environment of a host vehicle;
detecting an object in a path of the host vehicle based on the sensor data;
controlling a distance between the host vehicle and the detected object based on a preset gap ($t_{GAP}$);
estimating environmental conditions of the host vehicle based on the sensor data;
determining gap adaption indicators associated to the estimated environmental conditions, wherein each of the gap adaption indicators indicates an extension or a reduction of the preset gap ($t_{GAP}$); and
adjusting the preset gap ($t_{GAP}$) based on the gap adaption indicators; wherein
in the estimating step, at least one of the environmental conditions of oscillation in velocity of the detected object, traffic density, gap size between other vehicles, distance to successor of ego-vehicle, a curve, road surface state, construction site and time of day is estimated;
each of an increased oscillation in velocity of the detected object, an increased traffic density, a gap size between other vehicles larger that the preset gap ($t_{GAP}$), a distance to the successor of the ego-vehicle larger that the preset gap ($t_{GAP}$), beginning of a curve, deterioration in the road surface state, beginning of a construction site and beginning of night-time period is associated to a respective gap adaption indicator indicating an extension of the preset gap ($t_{GAP}$); and
each of a decreased oscillation in velocity of the detected object, a decreased traffic density, the gap size between other vehicles smaller that the preset gap ($t_{GAP}$), a distance to the successor of the ego-vehicle smaller that the preset gap ($t_{GAP}$), an end of a curve, an improved road surface state, an end of construction site and end of night-time period is associated to a respective gap adaption indicator indicating a reduction of the preset gap ($t_{GAP}$).

4. A method for assisting a driver in driving a vehicle, comprising the steps of:
producing sensor data by at least one sensor physically sensing the environment of a host vehicle and/or by obtaining data conveying information about the environment of a host vehicle;
detecting an object in a path of the host vehicle based on the sensor data;
controlling a distance between the host vehicle and the detected object based on a preset gap ($t_{GAP}$);
estimating environmental conditions of the host vehicle based on the sensor data;
determining gap adaption indicators associated to the estimated environmental conditions, wherein each of the gap adaption indicators indicates an extension or a reduction of the preset gap ($t_{GAP}$); and
adjusting the preset gap ($t_{GAP}$) based on the gap adaption indicators; wherein
the preset gap ($t_{GAP}$) corresponds to one of gap settings selectable by a user; and
in the adjusting step, current gap setting $n \in [n_{min}, \ldots ; n_{max}]$ is switched to gap setting n−1, if $n > n_{min}$ and the gap adaption indicators indicate to reduce the preset gap ($t_{GAP}$); and current gap setting n $n \in [n_{min}, \ldots ; n_{max}]$ is switched to gap setting n+1, if $n < n_{max}$ and the gap adaption indicators indicate to enlarge the preset gap ($t_{GAP}$).

5. A method for assisting a driver in driving a vehicle, comprising the steps of:
producing sensor data by at least one sensor physically sensing the environment of a host vehicle and/or by obtaining data conveying information about the environment of a host vehicle;
detecting an object in a path of the host vehicle based on the sensor data;
controlling a distance between the host vehicle and the detected object based on a preset gap ($t_{GAP}$);
estimating environmental conditions of the host vehicle based on the sensor data;
determining gap adaption indicators associated to the estimated environmental conditions, wherein each of the gap adaption indicators indicates an extension or a reduction of the preset gap ($t_{GAP}$); and
adjusting the preset gap ($t_{GAP}$) based on the gap adaption indicators; wherein
the preset gap ($t_{GAP}$) corresponds to one of gap settings $n_{min}$ to $n_{max}$ selectable by a user; and
in the adjusting step, gap size associated to each gap setting $n > n_{min}$ is reduced if the gap adaption indicators indicate to reduce the preset gap ($t_{GAP}$); and gap size associated to each gap setting $n < n_{max}$ is increased if the gap adaption indicators indicate to enlarge the preset gap ($t_{GAP}$).

6. A method for assisting a driver in driving a vehicle, comprising the steps of:
producing sensor data by at least one sensor physically sensing the environment of a host vehicle and/or by obtaining data conveying information about the environment of a host vehicle;
detecting an object in a path of the host vehicle based on the sensor data;
controlling a distance between the host vehicle and the detected object based on a preset gap ($t_{GAP}$);
estimating environmental conditions of the host vehicle based on the sensor data;
determining gap adaption indicators associated to the estimated environmental conditions, wherein each of the gap adaption indicators indicates an extension or a reduction of the preset gap ($t_{GAP}$); and
adjusting the preset gap ($t_{GAP}$) based on the gap adaption indicators, further comprising the steps of:
detecting a manual adjustment of the preset gap ($t_{GAP}$); and
storing current environmental conditions associated to the manual adjustment; wherein
at least the current geographic location of the ego-vehicle and the current time of day associated to the manual adjustment are stored;
when a geographic location that corresponds to the stored geographic location or a time of day that corresponds to the stored time of day are estimated in the estimating step, in the determining step, a gap adaption indicator indicating an adjustment of the preset gap ($t_{GAP}$) that corresponds to the manual adjustment is determined.

7. The method according to claim 6, further comprising the steps of
receiving from other vehicles at least one of
the current gap size applied by a driver,
the current time of day, and
the current geographical location;
storing all received gap sizes categorized by time and location; and
calculating the average gap size applied for each time and location.

8. A method for assisting a driver in driving a vehicle, comprising the steps of:
producing sensor data by at least one sensor physically sensing the environment of a host vehicle and/or by obtaining data conveying information about the environment of a host vehicle;
detecting an object in a path of the host vehicle based on the sensor data;
controlling a distance between the host vehicle and the detected object based on a preset gap ($t_{GAP}$);
estimating environmental conditions of the host vehicle based on the sensor data;
determining gap adaption indicators associated to the estimated environmental conditions, wherein each of the gap adaption indicators indicates an extension or a reduction of the preset gap ($t_{GAP}$); and
adjusting the preset gap ($t_{GAP}$) based on the gap adaption indicators; wherein
when the preset gap ($t_{GAP}$) is adjusted in the adjusting step and a manual correction of the adjusted preset gap ($t_{GAP}$) is detected, said gap adaption indicator is updated according to the manual correction.

9. A driver assistance system, designed for being mounted on a host vehicle and executing a method comprising the steps of:
producing sensor data by at least one sensor physically sensing the environment of a host vehicle or by obtaining data conveying information about the environment of a host vehicle;
detecting an object in a path of the host vehicle based on the sensor data;
controlling a distance between the host vehicle and the detected object based on a preset gap ($t_{GAP}$);
estimating environmental conditions of the host vehicle based on the sensor data;
determining gap adaption indicators associated to the estimated environmental conditions, wherein each of the gap adaption indicators indicates an extension or a reduction of the preset gap ($t_{GAP}$); and
adjusting the preset gap ($t_{GAP}$) based on the gap adaption indicators; wherein
in the estimating step, an ego-distance between the ego-vehicle and the detected object and distances between other vehicles are estimated;
in the determining step, at least one of the gap adaption indicators indicates whether or not the ego-distance fits the associated environmental condition; and
a gap adaption indicator is determined based on the difference between the ego-vehicle time gap and an average of the time gaps between the other vehicles, minimum of the time gaps between the other vehicles and/or maximum of the time gaps between the other vehicles.

10. The driver assistance system according to claim 9, comprising:
at least one sensor configured to physically sense the environment of a host vehicle;
means for receiving user input to switch on/off automatic gap adaptation; and
means for receiving user input indicating additive or multiplicative offset to the automatically determined gap.

11. A computer program product embodied on a non-transitory computer-readable medium, said product including computer-executable code which, when executed on a computer, controls the computer to carry out a method comprising the steps of:
producing sensor data by at least one sensor physically sensing the environment of a host vehicle or by obtaining data conveying information about the environment of a host vehicle;
detecting an object in a path of the host vehicle based on the sensor data;
controlling a distance between the host vehicle and the detected object based on a preset gap ($t_{GAP}$);
estimating environmental conditions of the host vehicle based on the sensor data;
determining gap adaption indicators associated to the estimated environmental conditions, wherein each of the gap adaption indicators indicates an extension or a reduction of the preset gap ($t_{GAP}$); and
adjusting the preset gap ($t_{GAP}$) based on the gap adaption indicators; wherein
in the estimating step, an ego-distance between the ego-vehicle and the detected object and distances between other vehicles are estimated;
in the determining step, at least one of the gap adaption indicators indicates whether or not the ego-distance fits the associated environmental condition; and
a gap adaption indicator is determined based on the difference between the ego-vehicle time gap and an average of the time gaps between the other vehicles, minimum of the time gaps between the other vehicles and/or maximum of the time gaps between the other vehicles.

12. A vehicle including a driver assistance system executing a method comprising the steps of:
producing sensor data by at least one sensor physically sensing the environment of a host vehicle or by obtaining data conveying information about the environment of a host vehicle;
detecting an object in a path of the host vehicle based on the sensor data;
controlling a distance between the host vehicle and the detected object based on a preset gap ($t_{GAP}$);
estimating environmental conditions of the host vehicle based on the sensor data;
determining gap adaption indicators associated to the estimated environmental conditions, wherein each of the gap adaption indicators indicates an extension or a reduction of the preset gap ($t_{GAP}$); and
adjusting the preset gap ($t_{GAP}$) based on the gap adaption indicators; wherein
in the estimating step, an ego-distance between the ego-vehicle and the detected object and distances between other vehicles are estimated;
in the determining step, at least one of the gap adaption indicators indicates whether or not the ego-distance fits the associated environmental condition; and
a gap adaption indicator is determined based on the difference between the ego-vehicle time gap and an average of the time gaps between the other vehicles, minimum of the time gaps between the other vehicles and/or maximum of the time gaps between the other vehicles,
wherein the driver assistance system comprises:
at least one sensor configured to physically sense the environment of a host vehicle;
means for receiving user input to switch on/off automatic gap adaptation; and
means for receiving user input indicating additive or multiplicative offset to the automatically determined gap.

* * * * *